Jan. 15, 1963 R. E. PRICE 3,073,074
WORK HANDLING MECHANISM FOR ROTARY GRINDER
Filed Aug. 12, 1959 8 Sheets-Sheet 1

FIG. 1.

R. E. PRICE
INVENTOR

BY Mason, Porter, Diller & Stewart
ATTORNEYS

FIG. 2.

R. E. PRICE
INVENTOR

FIG. 3

R. E. PRICE
INVENTOR

FIG. 5.

Jan. 15, 1963 R. E. PRICE 3,073,074
WORK HANDLING MECHANISM FOR ROTARY GRINDER
Filed Aug. 12, 1959 8 Sheets-Sheet 6

R. E. PRICE
INVENTOR

BY *Mason, Porter, Miller & Stewart*

ATTORNEYS

R. E. PRICE
INVENTOR

BY Mason, Porter, Miller & Stewart
ATTORNEYS

United States Patent Office 3,073,074
Patented Jan. 15, 1963

3,073,074
WORK HANDLING MECHANISM FOR
ROTARY GRINDER
Ralph E. Price, Waynesboro, Pa., assignor to Landis Tool
Company, Waynesboro, Pa., a corporation of Pennsylvania
Filed Aug. 12, 1959, Ser. No. 833,242
9 Claims. (Cl. 51—108)

The following specification deals with novel work handling mechanisms for rotary grinders.

In order to facilitate the presentation intermittently of work pieces to position opposite a rotary grinding wheel, it is of importance to render the operation as nearly automatic as possible. In like manner, the determination of the completion of grinding each work piece can be effected automatically and thus serve to initiate the removal and discharge of the complete work, and the presentation simultaneously of a new work piece. Economy of space is also of prime importance, since machines of this type tend to be unduly bulky and occupy considerable floor space.

One of the objects of my invention is to provide a novel loader for work pieces by which the new work pieces are presented between the headstocks in position to be held by the latter during a grinding operation in which the work pieces are reduced to the desired diameter.

Another object of the invention is to provide intermittent advance of the work pieces step by step by means of novel indexing means set in motion as a grinding operation is brought to the desired conclusion.

Among the objects of my invention is to provide a novel caliper or sizing device which can be advanced into engagement with the work piece while it is in the position of being ground to size.

Among the objects of my invention is to provide suitable, compact supports for the headstock and tailstock in the form of brackets mounted on the grinding wheel base and thus free the floor from obstruction.

A further object of my invention is to provide novel coupling means for the indexing drive.

As illustrating my invention by way of example, I have shown the preferred form thereof in the accompanying drawings in which.

In brief, the aim of this invention is to provide a compact automatic means by which work pieces are held in individual positions and intermittently advanced into position for treatment by a grinding wheel, sized and on completion of the grinding operation removed and discharged. The advance of the work is effected by novel indexing means suitably arranged for rapid and automatic operation.

On the drawings I have shown mechanism for grinding the diameter of a cylindrical work piece 15 to accurate size, and its final measurement and removal. The work piece in the present case is an elongated, cylindrical bar having a rectangular flange at one end. The purpose of the operation is to reduce this bar to a desired diameter at one or more points along its length.

This is effected by the use of a conventional grinding wheel 16 mounted on a slide 17, which in turn is moved along the base 18 forwardly into engagement with the work and rearwardly during the indexing operation which brings a new work piece 15 into position to be ground.

The base 18 has a coolant tank 19 which occupies the space in front and along each end of the base.

The base also carries an apron 20 in front by which the spent coolant and refuse material is properly drained from the space around the grinding operation. A conventional tailstock 21 is provided at the right-hand side of the grinding wheel structure. This tailstock is mounted upon a bracket 22, which is fixed on the front of the base 18.

Figure 1:
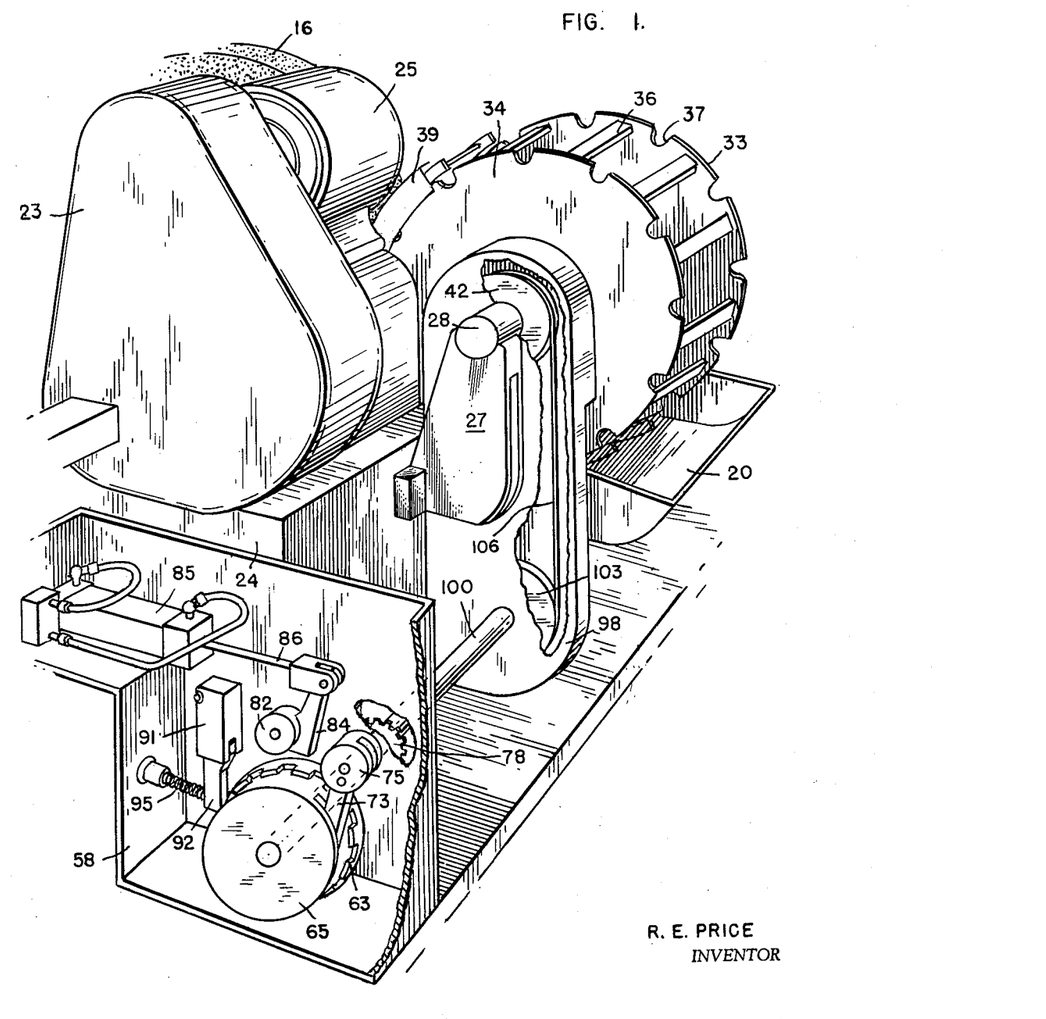
FIG. 1 is a perspective view of the improved work handling machine for rotary grinders.

A headstock 23 is mounted on a bracket 24, also forming part of the base 18 on the opposite side of the grinding wheel. As indicated in FIG. 1, the headstock is driven by an electric motor 25.

The work-indexing mechanism is mounted in position between the headstock and tailstock. A right-hand pillar block 26 is mounted on front of the base 18 opposite the tailstock 21. A second pillar block 27 is mounted on the frame at the left of the indexing mechanism. A fixed axle 28 is firmly mounted on the pillar blocks 26 and 27.

The indexing mechanism is revoluble on the fixed axle by means of anti-friction ball bearings 31 and 32.

Hub 29 has a disk 33 firmly attached. A similar disk 34 is bolted or otherwise attached to the opposite hub 30.

The anti-friction members 31 and 32 are locked in place on the fixed axle by means of clamping nuts 35, 35.

The disks 33 and 34 are held rigidly by intermediate spacing bars 36. These spacing bars are evenly distributed around the outer edges of the disks 33 and 34. Intermediate the spacing bars, the disks are notched at 37 to form aligned recesses. The recesses on disk 34 are provided with flanges or collars 38.

The hubs 29, 30, the disks 33, 34 and the spacing bars 36 form a drum carrier for the work piece 15, from the feed chute 40 to the discharge chute 41.

Figure 2:
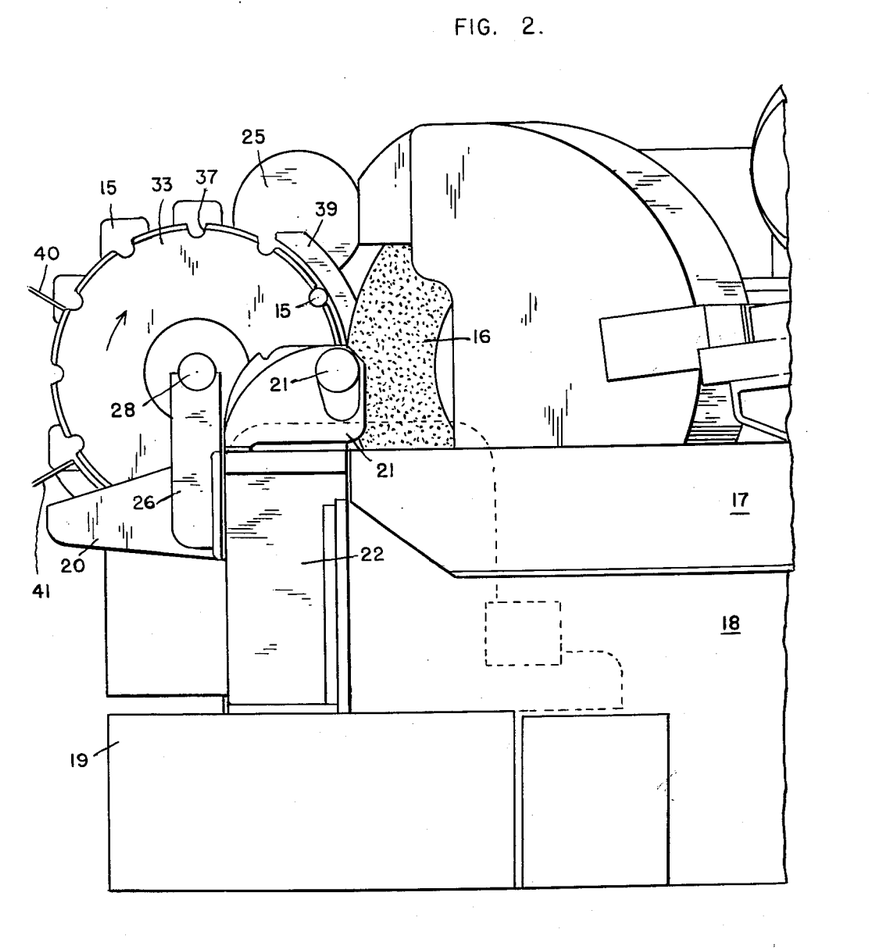
FIG. 2 is a right-hand end elevation of the same.

A guide rail 39 is mounted upon the base opposite the disk 34. This guide rail extends more than half the distance around the disk 33, as indicated on FIG. 2. It thus forms a track which will hold the work pieces in place in the notches 37 during the grinding operation. Thus the work pieces are fed from the chute 40 into notches 37 and carried over the top of the disks. At the point where gravity no longer supports the work pieces, they are held in place by the guide rail 39 until they reach the point of discharge into the discharge chute 41, as shown on FIG. 2.

The left hub 30 is extended to form a mounting for a pulley 42 by which the drum carrier is intermittently rotated.

The fixed axle 28 is provided with a manifold 43. The manifold contains an upper pressure cylinder 44 and a lower pressure cylinder 45. These cylinders are on opposite sides of the axle and extend laterally toward the grinding wheel 16. Parallel piston rods 46, 47 are slidably carried in the cylinders 44 and 45, respectively.

Figure 3:
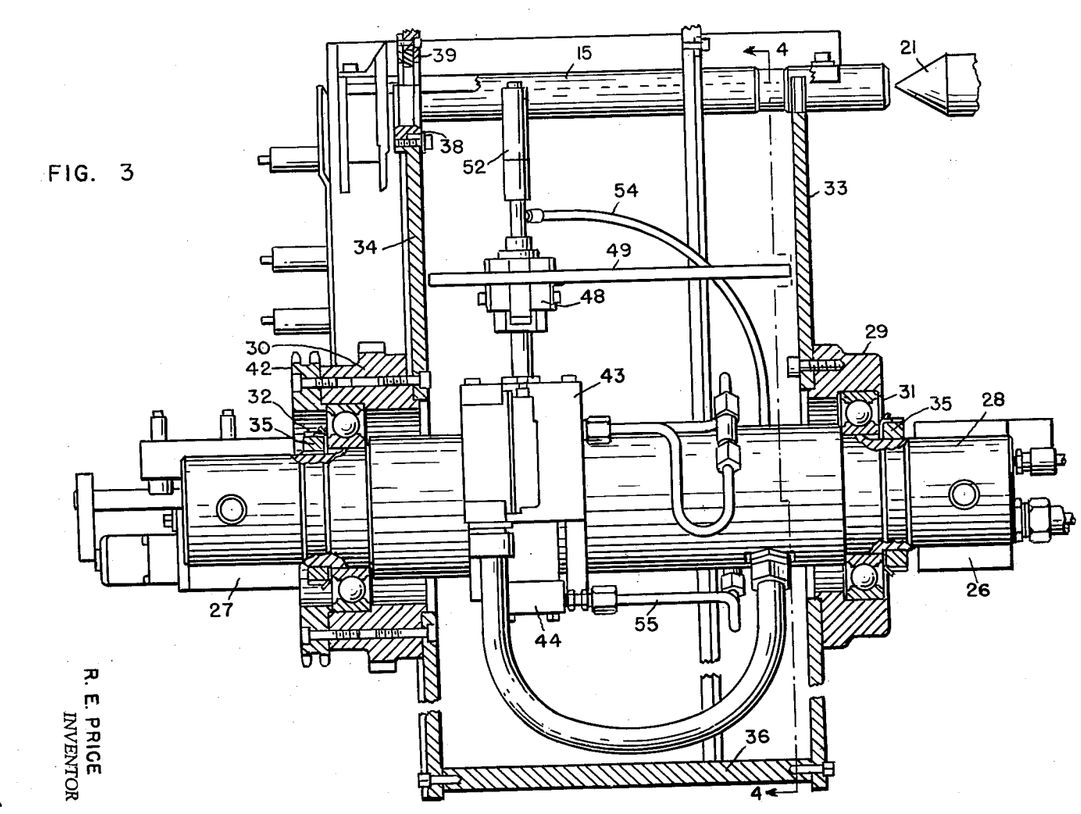
FIG. 3 is a horizontal section of the drum work-feeder taken on line 3—3 of FIG. 4.

The free ends of the piston rods are connected by means of a bracket 48. The bracket 48 carries a vertical shield 49, as shown on FIG. 3, for the purpose of protecting the working parts from coolant spray and the like.

Intermediate the bracket there is mounted a casing

Figure 4:
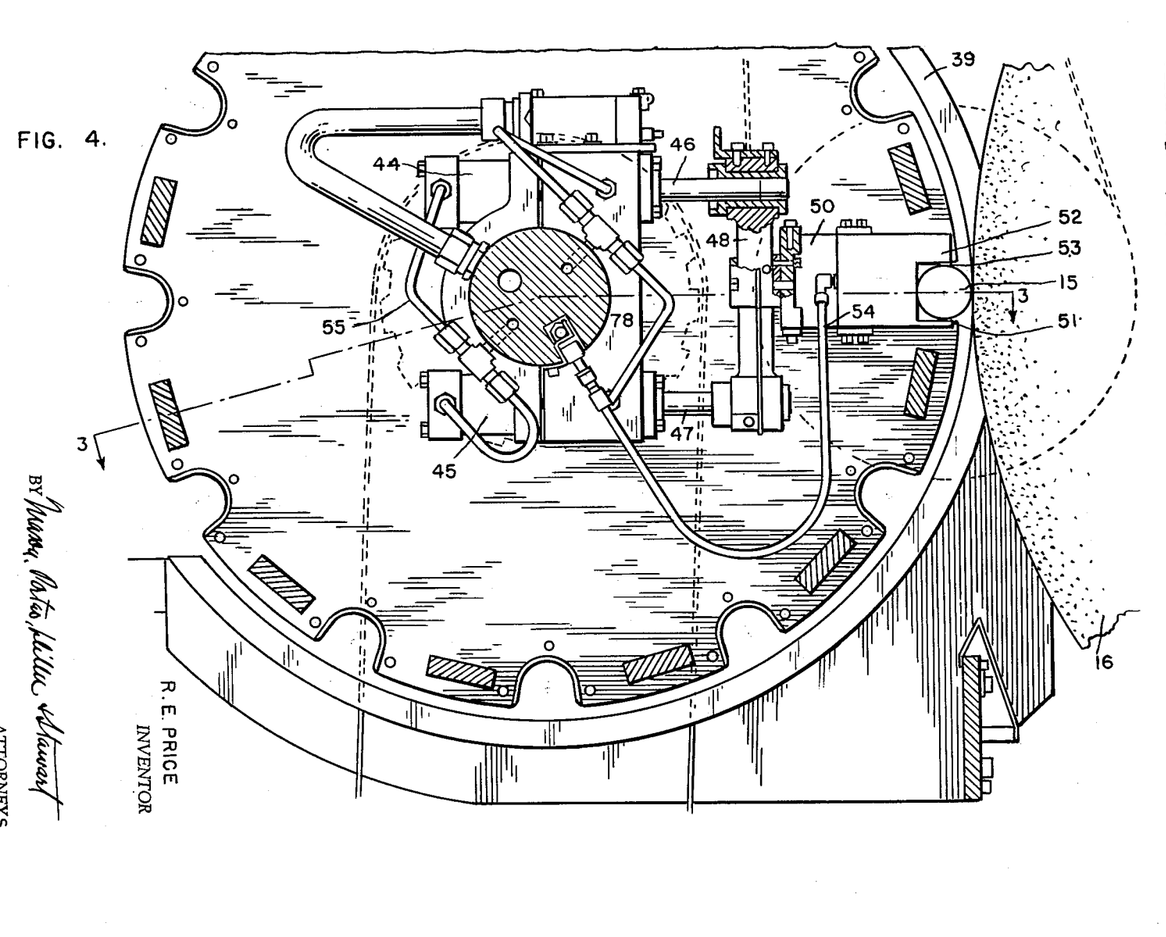
FIG. 4 is a vertical section of the same taken on the line 4—4 of FIG. 3.

50. This casing has a lower jaw 51 which projects as far as the periphery of the disk 33, as shown in FIG. 4, when the piston rods 46 and 47 are extended. An upper jaw 52 is also part of the casing 50 and is located opposite the lower jaw. The upper jaw 52 carries a pivoted finger 53, which can be moved downwardly by fluid pressure supplied by the pipe 54. This pipe 54 extends from the axle 28 which is bored, as shown in FIG. 4, to provide suitable ports for the application of fluid pressure or its exhaust.

A pipe 55 from axle 28 is branched to supply pressure to the rear ends of each cylinder 44 and 45. When the piston rods 46 and 47 are thus advanced, the casing 50 is brought forward to the position shown in FIG. 4, thus bracketing the work piece 15 which at the moment is being ground by the wheel 16.

Fluid pressure through pipe 54 is then timed to advance the finger 53, so that the diameter of the finished work is calipered. When the finger 53 advances the proper amount to indicate completion of the grinding operation to the desired degree, it serves to energize an electric circuit which will initiate the return movement of the sizing device casing 50 and the release of the drum carrier for an indexing movement. This will lower the completed work piece 15 and simultaneously bring in a new work piece for grinding.

The retraction of the sizing device casing 50 will also cause the grinding wheel feed to retract. It will remain retracted until the indexing movement is completed and the new work is in position as shown in FIG. 4.

Figure 5:
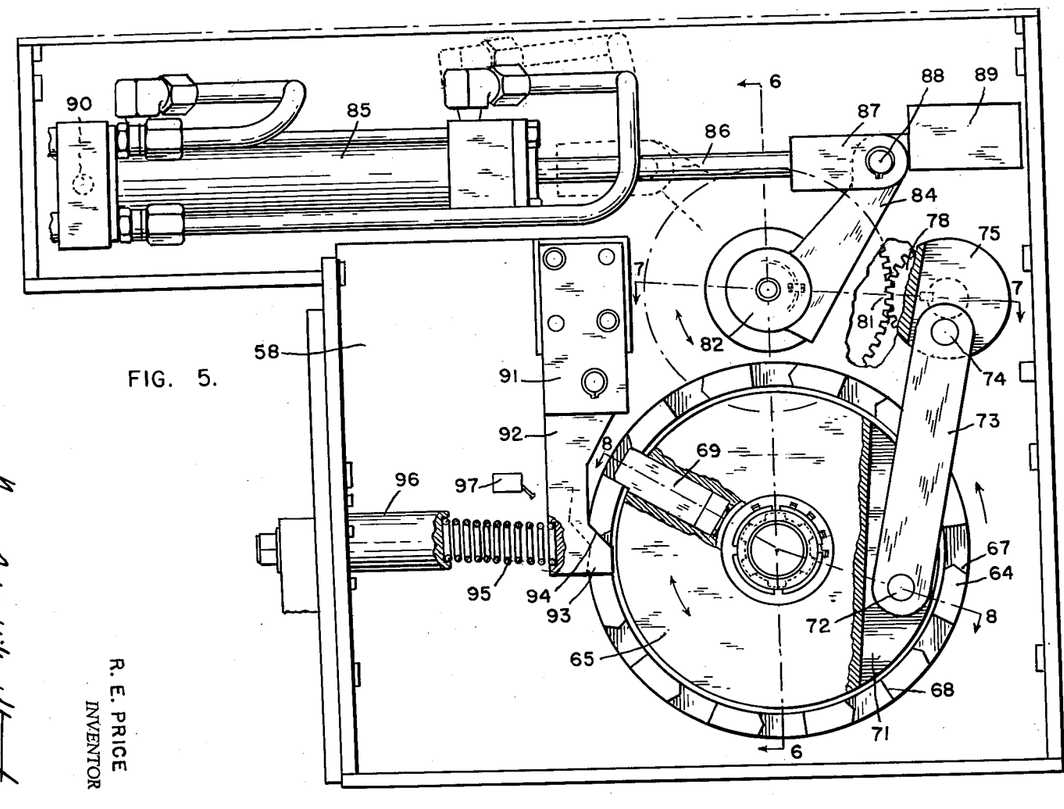
FIG. 5 is an end elevation of the indexing mechanism partly in section.
Figure 6:
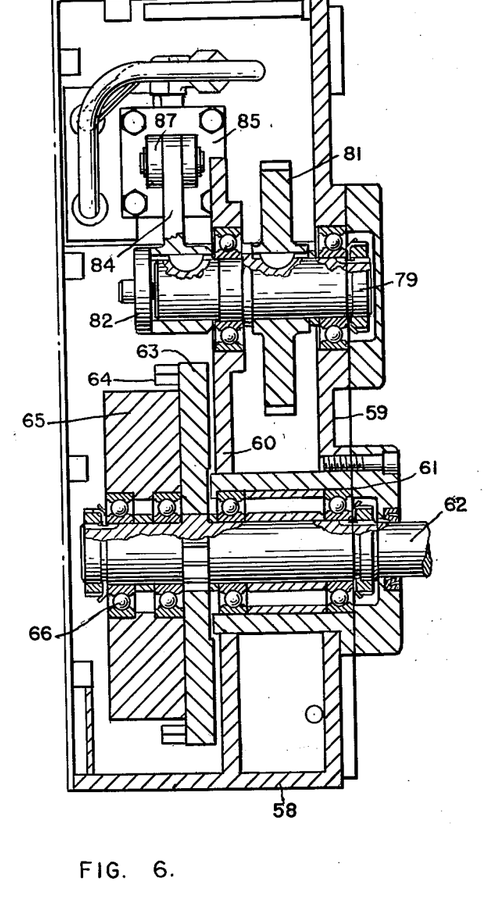
FIG. 6 is a vertical section of the same taken on the line 6—6 of FIG. 5.
Figure 7:
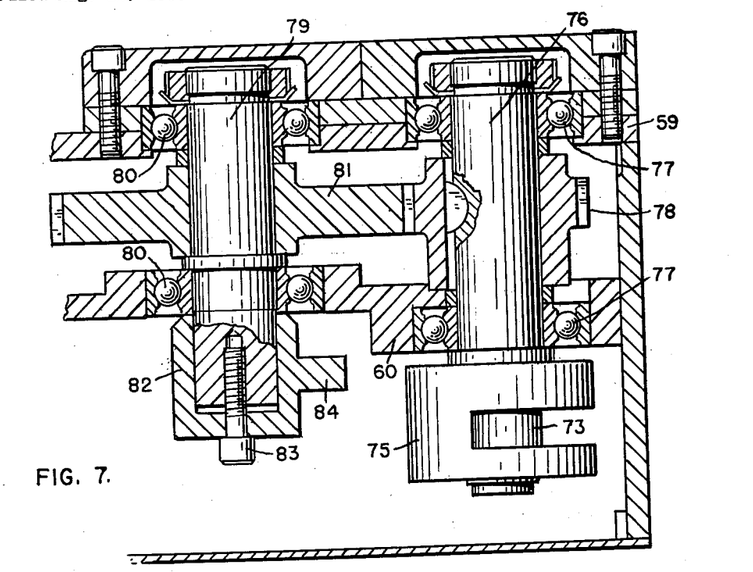
FIG. 7 is a horizontal section of the same taken on the line 7—7 of FIG. 5.
Figure 8:
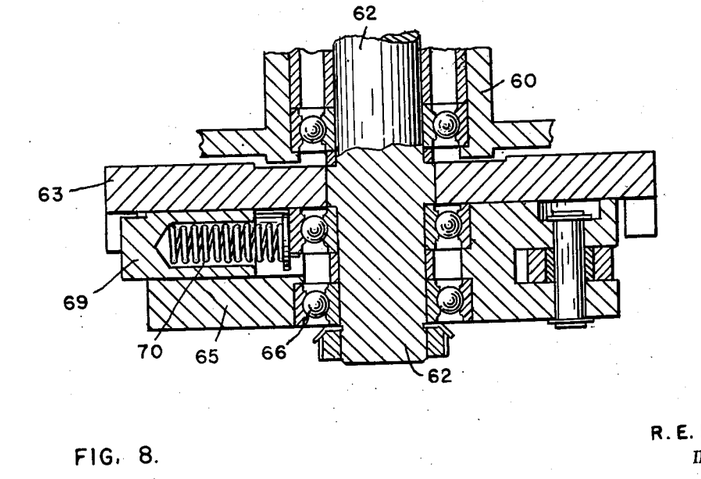
FIG. 8 is a horizontal section of the indexing advance members taken on line 8—8 of FIG. 5.
Figure 9:
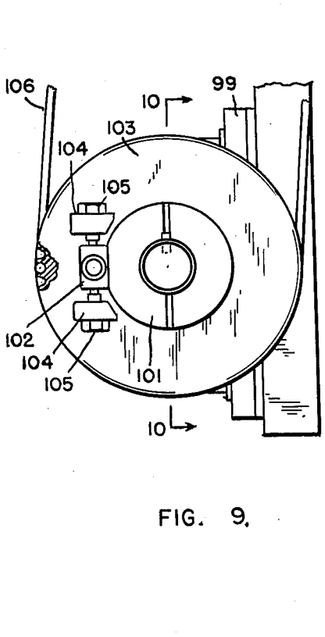
FIG. 9 is an end view of the indexing drive means.
Figure 10:
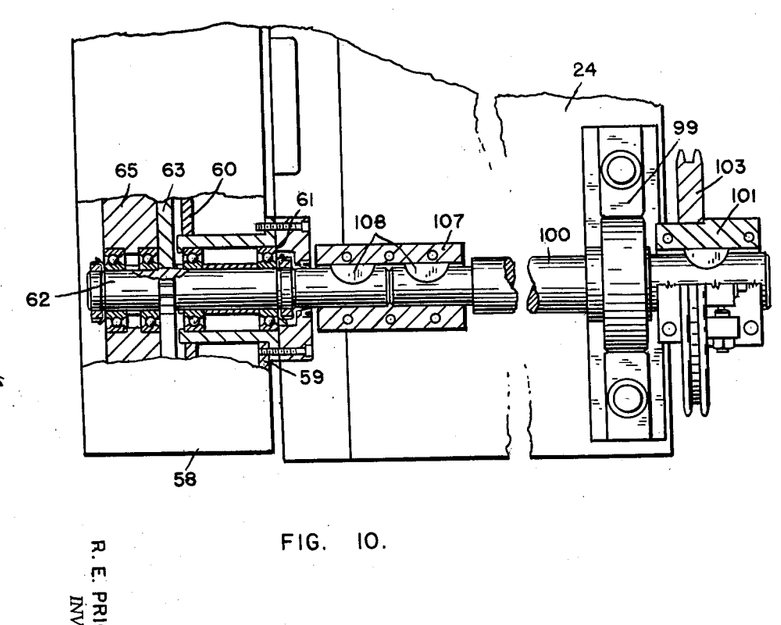
FIG. 10 is a horizontal section of the same taken on line 10—10 of FIG. 9.
Figure 11:
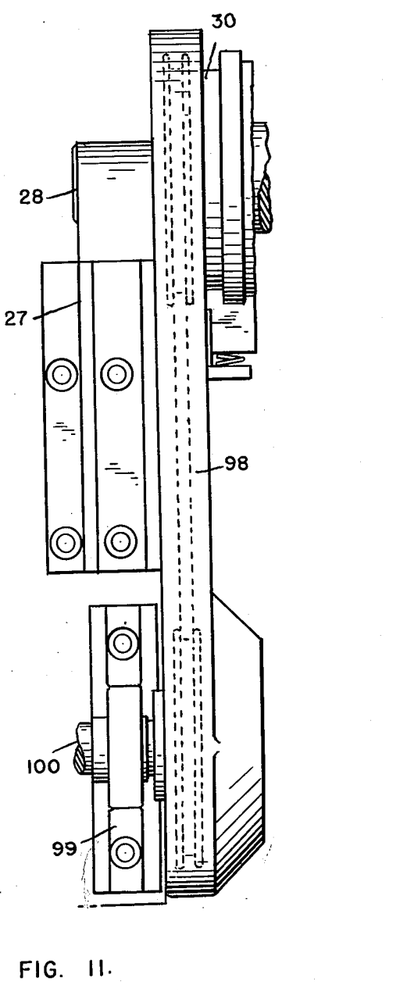
FIG. 11 is a front elevation of the indexing drive.

The drum carrier is advanced intermittently by the step-by-step indexing mechanism shown in FIG. 5. This indexing mechanism denoted generally 57, is mounted in a cabinet 58 at the left side of the grinding unit (FIG. 1). This cabinet 58 has an inner wall 59 and a spaced vertical partition or standard 60. An anti-friction bearing denoted generally 61 is mounted horizontally in the wall 59 and standard 60. A driveshaft 62 is revolubly mounted in the bearing 61.

The driveshaft 62 extends beyond the standard 60, where it has a fixed index ring 63 with teeth 64.

A rotor 65 is revolubly mounted on the driveshaft 62 by anti-friction bearing 66.

The teeth 64 of the index ring 63 have angular front faces 67 and radial rear faces 68, particularly adapted for the inetrmittent advance of the index ring in the direction indicated by the arrow in FIG. 5.

Step-by-step advance of the index ring 63 and driveshaft 62 is provided by intermittent oscillating movement of the rotor 65. The rotor carries a radially slidable plunger 69. The end of the plunger 69 is reduced as indicated on FIG. 5 to fit between adjacent teeth 64 of the index gear. A coil spring 70 is seated in the hollow rear end of the plunger 69 and backs up against the rotor bearing 66.

The opposite side of the rotor 65 has a groove 71 in the form of a sector. A pin 72 running between opposite sides of the groove forms a pivotal bearing for a link 73.

The opposite end of the link 73 is pivoted on a crankpin 74 mounted on the crank 75 of a transverse shaft 76. The shaft 76 is mounted in anti-friction bearings 77, 77 in the back wall 59 and the standard 60.

The shaft 76 has a keyed pinion 78. A second transverse shaft 79 is also journaled by anti-friction means 80, 80 in the back wall 59 and standard 60. The shaft 79 has a fixed gear 81 in mesh with the pinion 78.

Beyond the standard 60, the shaft 79 is extended to hold a collar 82 by means of a bolt 83. This collar 82 is provided with an arm 84 which extends upwardly as shown in FIG. 5.

A horizontal pressure cylinder 85 is mounted in the cabinet 58. This has a rod 86 extending toward the arm 84 to which it is connected by a yoke 87 and pivot 88.

A limit stop 89 is mounted in the cabinet 58 opposite the arm 84 and can be adjusted to control the extent of travel of the arm 84 and the rod 86. The pressure cylinder 85 is mounted at its rear end on a pivot 90 which allows arcuate movement due to the swing of the arm 84. It should be noted that the movement of the gear 81 of approximately 45 degrees causes the pinion 78 to move approximately 180 degrees and through link 73 causes the rotor 65 to oscillate approximately 10 degrees. This provides a much more accurate movement of the index ring 63 than if piston rod 86 was connected directly to rotor 65.

Mounted on the standard 60 is a bracket 91. A latch 92 is pivotally suspended from the bracket 91. The lower end of the latch has a tooth 93 with a right-angle face at the end. The inner end of the tooth 93 has an inclined surface 94. It will be seen from FIG. 5 that the tooth 93 is therefore adapted simultaneously to engage the radial face of tooth 64 on the index ring and the inclined face of the succeeding tooth so that tooth 93 does not interfere with the counter-clockwise movement of index ring 63.

A coil spring 95 holds the tooth 93 of the latch in the space between adjacent teeth 64 of the index ring. Spring 95 is mounted on the end of an abutment 96.

Spring 95 is materially stronger than spring 70. As a result, when plunger 69 advances and carries the index ring with it to a point where the plunger 69 is opposite the tooth 93, spring 95 overcomes spring 70 and tooth 93 drives the plunger 69 back out of engagement with the index ring. The plunger is thus free to be retracted and to engage the index ring between the next successive pair of teeth.

It will be noted that when piston rod 86 is in the advanced position as shown in FIG. 5, the gear 81 by a partial rotation will provide a multiplied radial movement for the crank 75 and sufficient advance of the link 73 to bring the plunger 69 into engagement with the index ring. Reverse movement of the piston rod 86 to the position shown in dotted lines in FIG. 5, provides clockwise movement for the crank 75. This causes the plunger 69 to advance the index ring one step. This then brings the plunger 69 opposite tooth 93 and the latter releases plunger 69 from engagement with the index ring. The plunger is then in position for retraction to the position shown in FIG. 5 for a new intermittent advance.

The maximum throw of crankpin 74 is 180° as indicated on FIG. 5. However the corresponding throw of crankpin 72 at the opposite end of link 73 is only sufficient to advance the plunger 69 and the index ring 63 the angular space between two adjacent teeth on the latter. Further, granted a rapid reciprocation of rod 86 and corresponding rapid oscillation of collar 82, the longitudinal movement of link 73 is slower at the ends of the movement than during the intermediate portion of the movement. Hence the rotor 65 accelerates from a limiting end position and decelerates at the opposite limiting end position thus cushioning the starting and stopping movements.

A limit switch 97 mounted in the cabinet, is actuated by the latch 92 when the latter is forced out of engagement with the index ring 63.

A casing 98 is mounted on bracket 24 inside the pillar block 27. This casing surrounds pulley 42. Beneath the pulley 42 and in line with shaft 62, bracket 24 has a journal bearing 99. This bearing supports a line shaft 100. On its inner end the shaft 100 carries a keyed sleeve 101 with a block 102.

A pulley 103 is journaled on the sleeve 101. The pulley carries spaced lugs 104, 104 with adjustment bolts 105, 105 in adjustable contact with block 102. In this way the radial position of the drum carrier can be adjusted to bring the work in grinding position at the end of an intermittent movement of the shaft 62.

Pulley belt 106 connects pulley 42 with pulley 103.

Shaft 100 is connected to shaft 62 by means of a split collar 107 formed of two semicylindrical parts bolted together. One part carries two keys 108, 108 which engage the adjacent ends of shafts 62 and 100.

From the above description it will be apparent that provision has been made for feeding work pieces intermittently and one at a time to a grinding wheel where they will be reduced to the desired diameter while being rotated by the headstock.

At the appropriate time the sizing or gauging device is advanced to embrace the work piece at the point where the grinding has taken place.

As soon as the work piece has been reduced to the desired diameter, finger 53 will close a switch and initiate an indexing movement.

This indexing movement is accomplished by the to-and-fro motion of the piston rod 86. This, by means of arm 84 and gear 81 and pinion 78, serves to transmit a partial rotation to the rotor 65 through the link 73.

This forward movement is applied through shafts 62 and 100, pulleys 103 and 42, to effect a step-by-step movement of the indexing drum.

The extent of movement will be determined by the position of the limit stop 89.

At the rotor 65 advances, the plunger 69 pushes against the rear of tooth 64 advancing it. This forces the tooth 93 of the latch 92 back against spring 95 permitting tooth 64 to pass. As the tooth 64 clears tooth 93, the latter moves forward into the space behind tooth 64 which space is occupied by plunger 69. Spring 95 is strong enough to drive plunger 69 out of the space and thus to allow the rotor to move in reverse direction until plunger 69 drops into the space behind the next succeeding tooth 64. The tooth 93 then serves to hold the index ring 63 in position until the next advancing movement of the rotor 65.

Timed actuation of the pressure cylinder 85 reverses the movement of piston rod 86, arm 84, gear 81 and pinion 78 and link 73. In this manner the rotor is turned backward until plunger 69 drops into the space between the next pair of teeth.

Limit switch 97 serves to signal the retraction of latch 92. This sets in motion the advance of the grinding wheel at the completion of the indexing movement.

If there is no work piece in the grinding position, the advance of the gauge will actuate the switch controlled by finger 53 and continue the cycle in the same manner as though a completed work piece were engaged.

The following sequence is carried out in the loading and indexing operations.

Assume a work piece to be placed in the appropriate notches of the drum carrier, and each of the grinding wheel tailstock and gauge retracted. When the piston rod 86 is moved, the rotary carrier advances the new work piece onto the grinding station, the indexing mechanism above described then reverses and is reset automatically.

The tailstock advances the work onto the headstock which starts rotating at slow speed for a preset, timed interval, during which work engagement takes place. This is followed by a grinding feed when the wheel base has reached its forward limit. The grinding feed is at a rapid rate until the wheel approach is reached, after which a slow rate of grinding feed is maintained by a suitable throttle valve. Finally the advance is terminated and the grinding is round out. At this point the sizer or gauge is advanced onto the work.

Subsequently the wheel base is retracted, and the gauge is also retracted, while the wheel base is reset in preparation for the next cycle.

When the work rotation stops, the tailstock is retracted and the work ejected from the headstock. This is followed by a new movement of the indexing mechanism, removing the finished work from between the centers and placing a new piece laterally between the centers in preparation of a new cycle of operation.

In the automatic cycling, when work pieces are not present in the grinding station of the index mechanism, the cycle continues until the wheel base advances, the gauge advances to actuate the equipment in the same manner it would if a satisfactorily completed work piece were in place.

It will be understood that the several successive movements in indexing and grinding are automatically carried out by means of suitable electric signaling and relay circuits by which the above indicated individual operations are carried out.

The invention having been described in its preferred form is, however, capable of embodiment in various forms including changes in material, arrangement and operating details, without departing from the scope of the invention as described in the following claims.

What I claim is:

1. Means for advancing a work piece relative to a rotary grinding wheel comprising a rotary drum having means for holding individual work pieces, a drive shaft therefor, an index ring on the shaft, a rotor journaled for free rotation on the shaft within said index ring, a radial plunger in the rotor, a spring impelling the plunger into engagement with the index ring, a gear, means for oscillating the gear, a pinion engaging the gear, a crank on the pinion, a link from the crank to the rotor and means for disengaging the plunger from the index ring at the end of the rotor's advance movement.

2. In combination in a grinding machine, a headstock and a tailstock, a rotary grinding wheel slidable into and out of operative position between said headstock and tailstock, a drum mounted in position to present work pieces to said headstock and tailstock, means for indexing said drum, means for advancing the grinding wheel, means mounted within the drum for sizing the work, means responsive to the sizing means to retract the grinding wheel, and index the drum.

3. Means for advancing a workpiece relative to a rotary grinding wheel comprising a rotary drum having means for holding individual workpieces, a drive shaft therefor, an index ring on the shaft, a rotor journaled for free rotation on the shaft within said index ring, a radial plunger in the rotor, a spring impelling the plunger into engagement with the index ring, a gear, a pinion engaging the gear, a crank on the pinion, a link from the crank to the rotor, means for disengaging the plunger from the index ring at the end of the rotor's advance movement, an arm on said gear and a fluid pressure reciprocating motor connected to said arm.

4. Means for handling workpieces relative to a rotary grinding machine, comprising a fixed axle, a drum having spaced hubs revolubly mounted on the axle, a disk on each hub, work-holding means on the peripheries of said disks, means for advancing the drum step-by-step, a bracket mounted on the axle between the disks, means for reciprocating the bracket radially of the drum, a sizing member mounted on the bracket and means for advancing said sizing member into engagement around a workpiece.

5. Means for handling workpieces relative to a rotary grinding machine, comprising a fixed axle, a drum having spaced hubs revolubly mounted on the axle, a disk on each hub, work-holding means on the peripheries of said disks, means for advancing the drum step-by-step, a bracket mounted on the axle between the disks, a sizing member mounted on the bracket and pressure means for advancing the bracket radially of the drum and sequentially advancing the sizing member into engagement around a workpiece.

6. Means for handling workpieces relative to a rotary grinding machine, comprising a fixed axle, a drum having spaced hubs revolubly mounted on the axle, a disk on each hub, work-holding means on the peripheries of said disks, means for advancing the drum step-by-step, a bracket mounted on the axle between the disks, means for reciprocating the bracket radially of the drum, a sizing member mounted on the bracket, a movable finger on the sizing member and pressure means for advancing the bracket radially of the drum and sequentially advancing the sizing member opposite a workpiece and moving the said finger into engagement with the workpiece.

7. In a machine tool, a bed, means for rotatably supporting a workpiece on said bed comprising spaced forwardly extended portions on said bed, a headstock mounted on one of said portions and a footstock mounted on the other of said portions, a work carrier rotatably supported between said extending portions for presenting successive workpieces to be supported by said headstock and said footstock, a tool support slidably mounted on said bed for movement toward and from a workpiece carried by said headstock and said footstock, means for indexing said work carrier comprising a shaft for driving said work carrier, a rotor freely rotatable on said shaft, a notched ring slightly larger in diameter than said rotor and keyed to the shaft in position to rotate relative to the peripheral surface of said rotor, a retractable plunger in said rotor for engaging said ring notches to lock said notched ring and said rotor together for rotating said notched ring, a resiliently actuated latch for entering said notched ring and releasing said plunger therefrom whereby to permit said notched ring to return to starting position and said plunger to enter the next notch.

8. In a machine tool, a bed, means for rotatably supporting a workpiece on said bed comprising extended portions in spaced relation on the front of said bed, a headstock mounted on one of said portions, a footstock mounted on the other of said portions, a tool support slidably mounted on said bed for movement toward and from said work supporting means, a work carrier, means for rotatably supporting said work carrier between said extended portions for presenting successive workpieces to said headstock and said footstock comprising a nonrotatable shaft supported on said extended portions, a gauging device on said shaft having means for co-acting with a predetermined portion of the workpiece, and means for moving said co-acting means toward and from operative relation to the workpiece.

9. In a machine tool, means for advancing successive workpieces into operative relation with a cutting tool comprising a rotary carrier having peripherally spaced work receiving portions, a driving shaft for rotating said carrier, an indexing ring on said shaft, a rotor mounted for free rotation on said shaft, means for temporarily connecting said rotor and said indexing ring, means for oscillating said rotor comprising a pinion of smaller diameter than the rotor, and means for reciprocating said pinion through substantially one half revolution, a link having one end attached to said pinion so as to move through said one half revolution between fully retracted and fully advanced positions, the other end of said link being pivoted eccentrically to said rotor, so that said pinion causes a substantially smaller angular movement of said rotor, providing a materially accelerated and decelerated movement of said rotor at its limits of movement for cushioning the stopping and starting of said rotor.

References Cited in the file of this patent
UNITED STATES PATENTS

| | | |
|---|---|---|
| 2,170,672 | Anderson | Aug. 2, 1939 |
| 2,201,798 | Scott et al. | May 21, 1940 |
| 2,404,161 | Bower | July 16, 1946 |
| 2,450,371 | Coates | Sept. 28, 1948 |
| 2,517,193 | Fraser | Aug. 1, 1950 |
| 2,660,895 | Waters | Dec. 1, 1953 |
| 2,696,986 | Grobey | Dec. 14, 1954 |